A. P. BRUSH.
LUBRICATING SYSTEM FOR INTERNAL COMBUSTION ENGINES.
APPLICATION FILED JUNE 1, 1915.
1,230,460.
Patented June 19, 1917.
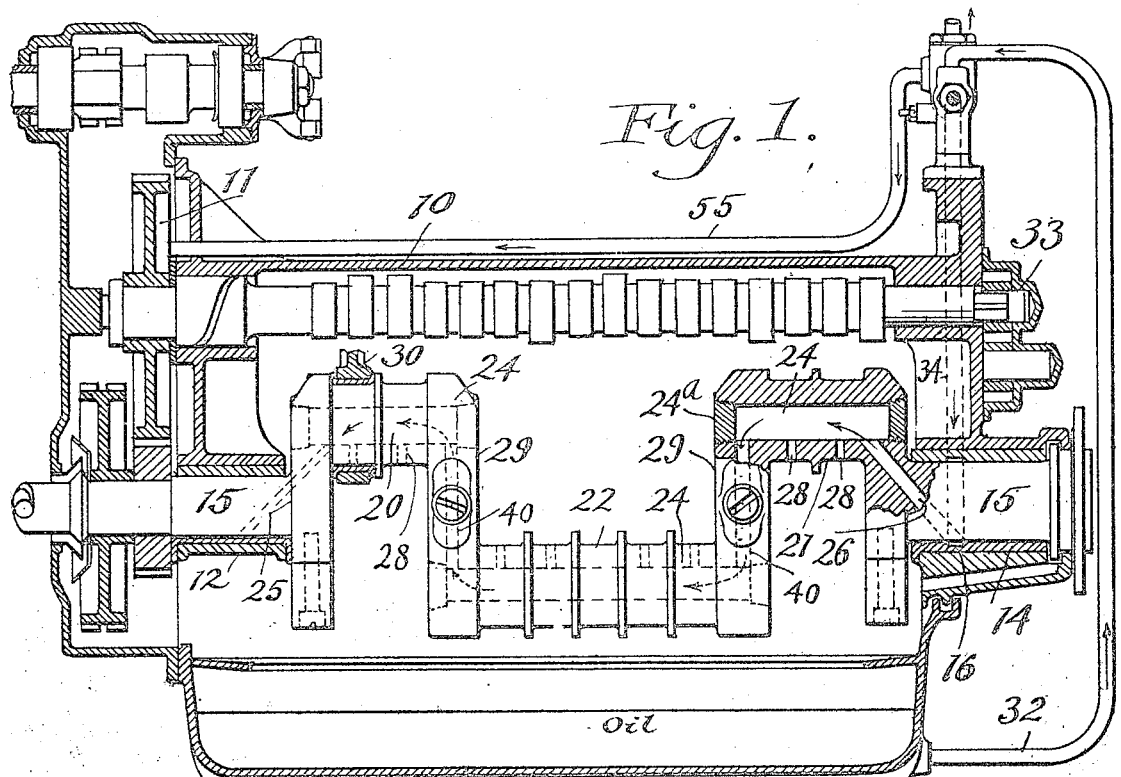
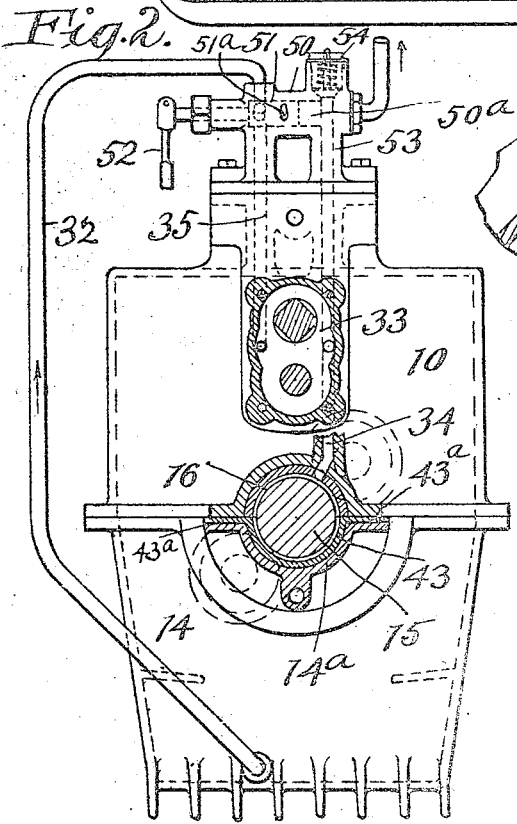
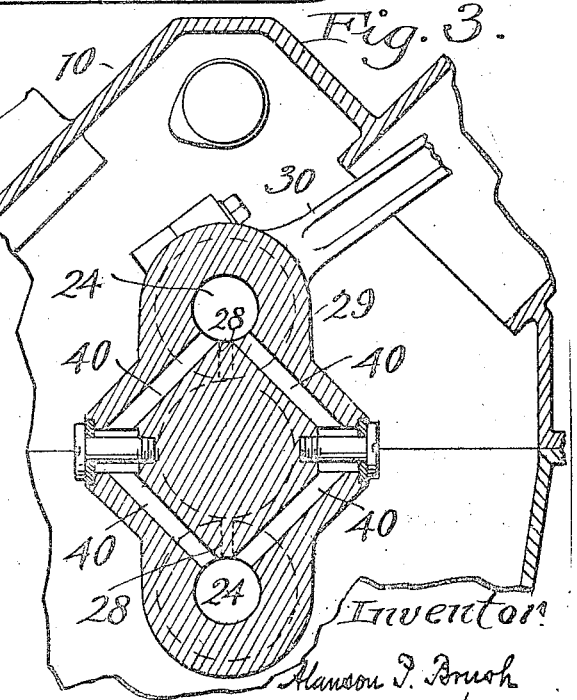

UNITED STATES PATENT OFFICE.

ALANSON P. BRUSH, OF DETROIT, MICHIGAN.

LUBRICATING SYSTEM FOR INTERNAL-COMBUSTION ENGINES.

1,230,460.  Specification of Letters Patent.  Patented June 19, 1917.

Application filed June 1, 1915. Serial No. 31,491.

*To all whom it may concern:*

Be it known that I, ALANSON P. BRUSH, a citizen of the United States, residing at Detroit, in the county of Wayne and State of Michigan, have invented a certain new and useful Improvement in Lubricating Systems for Internal-Combustion Engines, of which the following is a full, clear, and exact description.

This invention relates to engines whose crank shafts have between their supporting bearings, two or more crank pins which are engaged by connecting rods.

The primary object of this invention is to uniformly lubricate those bearing surfaces of the crank pins with which the connecting rods engage.

Another object is to lubricate the crank shaft bearings.

Another object is to lubricate said parts in proportion to their needs, or, more definitely, to increase the oil delivered to said parts as the throttle valve is open, and vice versa.

Another object is to effect the above results with the minimum pump-induced movement of the oil. And, finally, the object is to effect these results by an inexpensive construction and combination of parts.

The invention is shown in the drawing and hereinafter described and definitely pointed out in the appended claims.

In the drawing, Figure 1 is a longitudinal central vertical section through the crank case and associated parts; Fig. 2 is an end view partly sectioned of the right end of Fig. 1; Fig. 3 is a vertical transverse section of said crank case, the section passing through one of the crank arms.

Referring to the parts by reference characters, 10 represents the crank case of an internal combustion motor, 12 and 14 the bearings carried thereby in which the crank shaft 15 is rotatably mounted. Between the supporting bearings the crank shaft has a plurality of crank pins. In the construction shown there are three crank pins. Two of these crank pins, 20 and 21, are designed to receive two connecting rods 30, while the other and middle crank pin 22 is designed to receive four of such connecting rods. The specific crank shaft shown is therefore designed for an eight-cylinder engine; and more particularly an engine of the V-type, although the invention is not restricted to this type of engine or to a crank shaft having the particular kind of crank pins specified.

33 is an oil pump of any suitable construction, which draws oil from the crank case 10 through a pipe 32; and discharges its oil through a duct 34 into an annular oil groove 16 in one of the crank shaft bearings 14.

From this oil groove 16 the oil flows through a closed conduit carried by the crank shaft; and preferably one terminal of this conduit discharges into the bearing 12 at the opposite end of the crank shaft. This conduit includes a hole 24 which extends longitudinally in each of the crank pins, which holes are closed at their ends by plugs 24ª. Also this conduit includes an oil hole 26 in the crank shaft connecting the oil groove 16 with the adjacent hole 24. In the preferred construction, but not necessarily, this conduit includes an oil hole 25 extending diagonally in the crank shaft from the surface of that part of the crank shaft which is mounted in the bearing 12 to the hole 24 in the adjacent crank pin 20. This oil conduit also includes oil tubes 40 which connect in series the several holes 24 in the crank pins.

There is an oil delivery duct 28 formed through that part of each crank pin which serves as a bearing for a connecting rod,— said duct communicating at one end with the hole 24 and leading therefrom toward the axis of the crank shaft. In the construction shown there are eight of these delivery ducts, because the crank pins are constructed to engage eight connecting rods; but because these oil delivery ducts do extend from the holes 24 toward the axis of the crank shaft, instead of away from it, centrifugal force generated by the rotation of the crank shaft will not tend to cause the oil to run out of said oil ducts, but on the contrary.

The so-called oil holes 40 are shown as formed in the crank arms 29; but that merely represents one manner of forming them. One exceedingly valuable characteristic of these connecting oil tubes 40 as constructed is that they do not at any point approach nearer to the axis of the crank shaft than are the delivery ends of the oil delivery ducts 28.

When the engine is in operation, oil will be forced by the oil pump into the oil groove 16, from which it will flow, under pressure, through the oil tube 26 into the hole 24 in the crank pin 21, thence through the oil holes 40 to the hole 24 in the crank pin 22, thence through the oil holes 40 to the hole 24 in the crank pin 20, and thence through the oil hole 25 from which it will be delivered onto the bearing surfaces of the bearing 12 and the crank shaft 15 therein mounted. This crooked column of oil will always be under pressure derived from the pump. This pressure will be uniform from end to end of the column. Because of this pressure, oil will be forced out of the oil ducts 28 onto the bearing surfaces of the crank pins and connecting rods. The rate of flow of oil will depend upon the pressure that this oil column is under. Centrifugal force opposes the flow of oil from these oil passages 28, but with equal force as to all of them. The resultant force tending to force oil out of these oil delivery ducts 28 will, therefore, be uniform at all points of the oil column; and therefore, there will be a uniform flow of oil from all of said ducts. If some part of the oil conduit were nearer the axis of the shaft than the delivery ends of the ducts 28, centrifugal force at high speeds would be apt to break the column of oil and thereby oil would in a short time cease to flow out of the ducts 28, beyond said break. The extension of ducts 28 from the oil holes 24, toward the axis of the shaft, practically prevent said ducts 28 from becoming choked by sediment in the oil, because centrifugal force will throw the heavier sediment out of the outer walls of the holes 24.

In order to facilitate the formation of the annular oil groove 16 in the bearing 14, and the making of it so tight that no appreciable leakage from it will take place, the lower part 14$^a$ of the bearing 14 of the crank shaft is formed with a soft metal half bushing 43, having laterally extended flanges 43$^a$ which extend between the opposed surfaces of the upper half of said bearing and its removable lower part 14$^a$ of said bearing. The upper half of the bearing, which is a part of the crank case proper also has a soft metal half bushing, but this does not extend outside of the bearing recess. Now, it is very easy to finish the opposed edges of these two bushing members so that they will fit tightly together, and it is also easy to form in their inner surfaces the oil groove 16.

Associated with the oil circulating system is a valve casing 50 containing valves. One of these valves is a rotary cylindrical plug valve 51, which is so placed that it is interposed between the pump and the oil pipe 32 which comes up from the oil reservoir formed by the crank case. This valve has a hole through which the oil must pass as it goes from the oil pipe 32 to the duct 35 leading from the valve casing to the intake side of the oil pump. The projecting stem of this valve has an operating handle 52 which is provided so that it may be easily connected with the throttle valve of the motor. Associated with this valve 51, however, are two stops which limit its turning movement. These stops are the ends of a slot formed in the casing for engaging a pin 51$^a$. The length of this slot is such that the valve can never be entirely closed; by reason of which fact there will always be some oil flowing even when the engine is running idle; and also so that the valve can never pass the wide open position.

An oil duct 53 through which the pump discharges oil goes to a chamber 50$^a$ in the same valve casing 50. An oil duct 34 goes from this chamber to the oil groove 16.

Connected with this same chamber is an oil pipe 55 which discharges into the timing gear casing 11. Between said chamber and oil pipe 55 is a safety valve 54 which is constructed so that it cannot prevent a very small flow of oil through this conduit to the timing gear casing, and therefore it is insured that this shall always have enough oil to lubricate the gears therein. But the safety valve has its spring so adjusted that it will remain closed until the oil in the oil conduit which leads to the crank pins is under the desired pressure; and when this pressure is exceeded will open and allow the excess oil to flow into the timing gear casing.

From the foregoing it is obvious that by actuating the valve 51 the rate of flow of oil to the oil conduit which goes through the crank pins may be increased and diminished. If the handle 52 of this valve should be connected with the engine throttle, this increase will be proportionate to the opening of the throttle. The opening of the throttle under some conditions will cause the engine to run faster, and under other conditions, such as when the engine is heavily loaded, it will merely cause it to do more work. In either event, more oil is supplied because more is needed. The refinements brought about by the valve casing 50 and its associated parts are obviously not at all necessary to the primary invention. It is likewise obvious that oil from the oil hole 24 in the crank pin 20 need not be discharged onto the bearings 12, although the described construction is an economical and efficient means for lubricating said bearings.

It is also obvious that the formation of the oil tubes 40 in the crank arms is not essential to the primary invention, and perhaps is not the best construction from the view-point of efficiency. It is, however, the cheapest construction and is a construction which operates with great enough efficiency for the purpose.

Having described my invention, I claim:—

1. The combination of a crank shaft having a plurality of crank pins between its bearings, a crank case, bearings in the crank case for said crank shaft, one of said bearing having in its inner surface an oil groove, said crank shaft being formed with an oil conduit which includes longitudinal holes in the crank pins an oil tube connecting said oil groove in said bearing with the oil hole in the adjacent crank pin and other oil tubes which connect in series the oil holes in said crank pins, there being oil delivery ducts leading from the holes in the crank pins to the surfaces of said crank pins and toward the axis of the crank shaft, an oil pump which discharges into the oil groove in said shaft bearing, a conduit connecting the intake side of said pump with said crank case, a valve in said conduit to regulate the pump-induced flow of oil from said crank case, means to prevent the complete closure of said valve.

2. The combination of a crank shaft having a plurality of crank pins between its bearings, a crank case, bearings in the crank case for said crank shaft, one of said bearings having in its inner surface an oil groove, said crank shaft being formed with an oil conduit which includes longitudinal holes in the crank pins an oil tube connecting said oil groove in said bearing with the oil hole in the adjacent crank pin and other oil tubes which connect in series the oil holes in said crank pins, there being oil delivery ducts leading from the holes in the crank pins to the surfaces of said crank pins and toward the axis of the crank shaft, an oil pump which discharges into the oil groove in said shaft bearing, a conduit connecting the intake side of said pump with said crank case, a valve in said conduit to regulate the pump-induced flow of oil from said crank case, means to prevent the complete closure of said valve, a valve casing, a conduit leading from the discharge end of said pump to said valve casing, an oil conduit leading from said valve casing to the oil groove in the shaft bearing, an oil pipe leading from said valve casing back to the crank case, and a safety valve in said valve casing intermediate of the last named oil pipe and oil conduit which conveys oil to said valve casing.

3. The combination with a crank shaft having two bearings and having a plurality of crank pins between its bearings, one of said bearings including two parts which are separably connected together, a soft metal bushing in one part of the bearing, which bushing has outwardly extended flanges which project between the two parts of the bearing and are clamped between them when the two parts are connected together, a soft metal bushing in the other half of said bearing,—whose edges engage the bushing in the other part of said bearing,—the two bushing members being formed with registering internal annular grooves, means for delivering oil under pressure into said annular grooves, said crank shaft being formed with a longitudinal oil conduit which extends through the crank pins of said crank shaft, and which communicates with the grooves in said bushings, which oil conduit has oil delivery ducts that discharge onto the bearing surfaces of said crank pins.

In testimony whereof, I hereunto affix my signature in the presence of two witnesses.

ALANSON P. BRUSH.

Witnesses:
E. L. THURSTON,
E. B. GILCHRIST.